United States Patent
Mochizuki

(10) Patent No.: US 12,528,490 B2
(45) Date of Patent: Jan. 20, 2026

(54) CONTROL DEVICE, CONTROL METHOD, AND STORAGE MEDIUM

(71) Applicant: TOYOTA JIDOSHA KABUSHIKI KAISHA, Toyota (JP)

(72) Inventor: Kento Mochizuki, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 18/480,320

(22) Filed: Oct. 3, 2023

(65) Prior Publication Data
US 2024/0239363 A1  Jul. 18, 2024

(30) Foreign Application Priority Data
Jan. 16, 2023 (JP) .................. 2023-004687

(51) Int. Cl.
*B60W 50/14* (2020.01)
*G01C 21/36* (2006.01)

(52) U.S. Cl.
CPC ............. *B60W 50/14* (2013.01); *G01C 21/36* (2013.01)

(58) Field of Classification Search
CPC ......... B60W 50/14; G01C 21/36; H04R 3/00; B60R 16/02; B60R 16/023; G01R 31/52; G01R 31/54; H04M 11/022
See application file for complete search history.

(56) References Cited

U.S. PATENT DOCUMENTS

| | | | | |
|---|---|---|---|---|
| 5,836,002 A | * | 11/1998 | Morstein | B62H 5/20 340/432 |
| 2004/0160316 A1 | * | 8/2004 | Trent | G08B 3/10 340/384.4 |
| 2006/0071804 A1 | * | 4/2006 | Yoshioka | G08B 25/016 340/636.1 |
| 2008/0143497 A1 | * | 6/2008 | Wasson | G08G 1/205 340/425.5 |
| 2009/0110185 A1 | * | 4/2009 | Yamamoto | G08B 25/016 379/406.01 |
| 2017/0140637 A1 | * | 5/2017 | Thurlow | G08B 21/182 |
| 2018/0272973 A1 | * | 9/2018 | Kobayashi | G08B 25/10 |
| 2019/0075444 A1 | * | 3/2019 | Lin | H04M 1/00 |
| 2024/0147206 A1 | * | 5/2024 | Sharma | H04N 21/4363 |

FOREIGN PATENT DOCUMENTS

JP        2017-174120 A        9/2017

* cited by examiner

*Primary Examiner* — Abdalla A Khaled
(74) *Attorney, Agent, or Firm* — SoralP, Inc.

(57) ABSTRACT

A control device includes a control unit configured to, when an emergency call is sent or received, check whether there is a disconnection or ground fault of a line that transmits a mute signal to the navigation device, and when the disconnection or ground fault of the line is detected, causes an output device to output predetermined data.

3 Claims, 3 Drawing Sheets

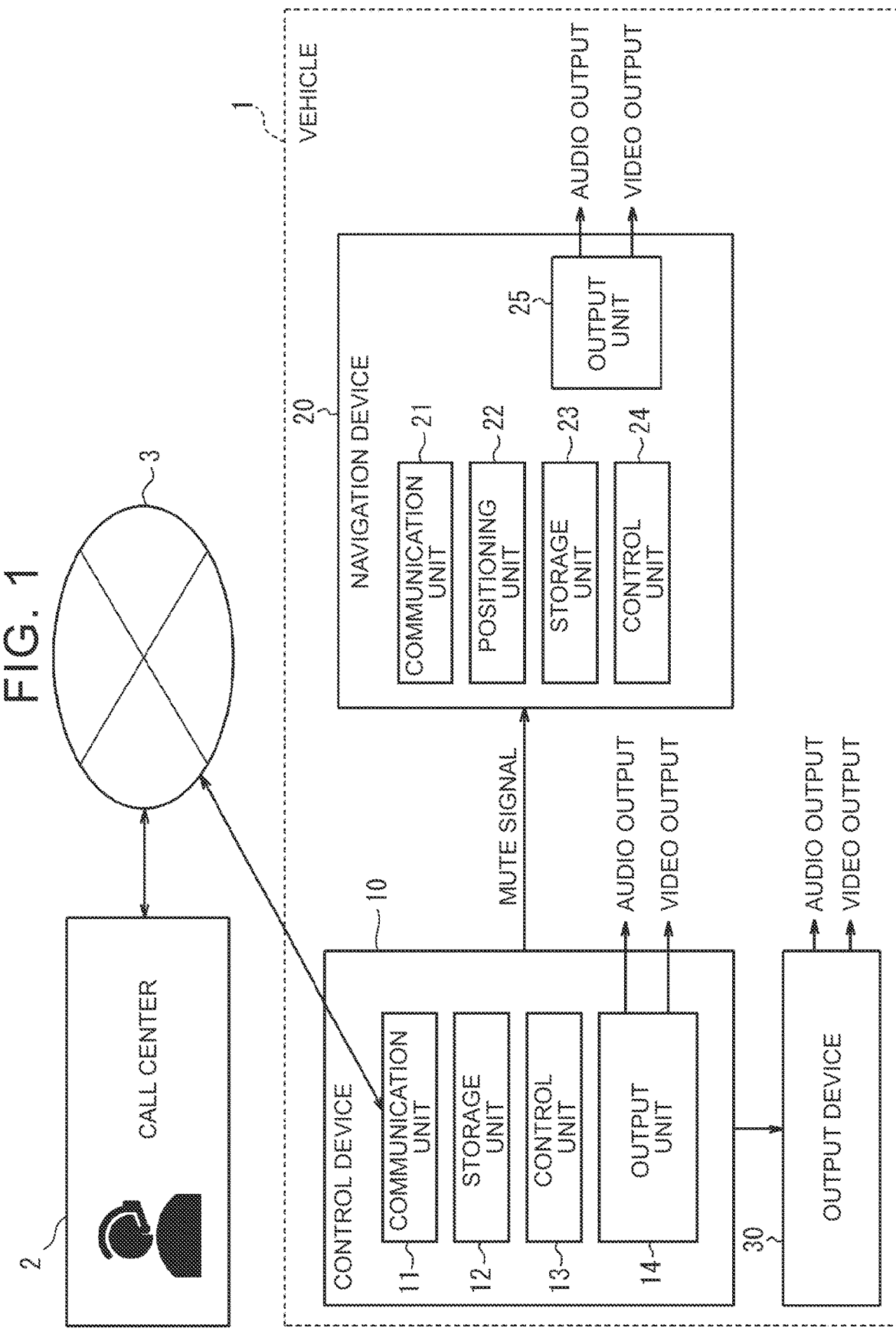

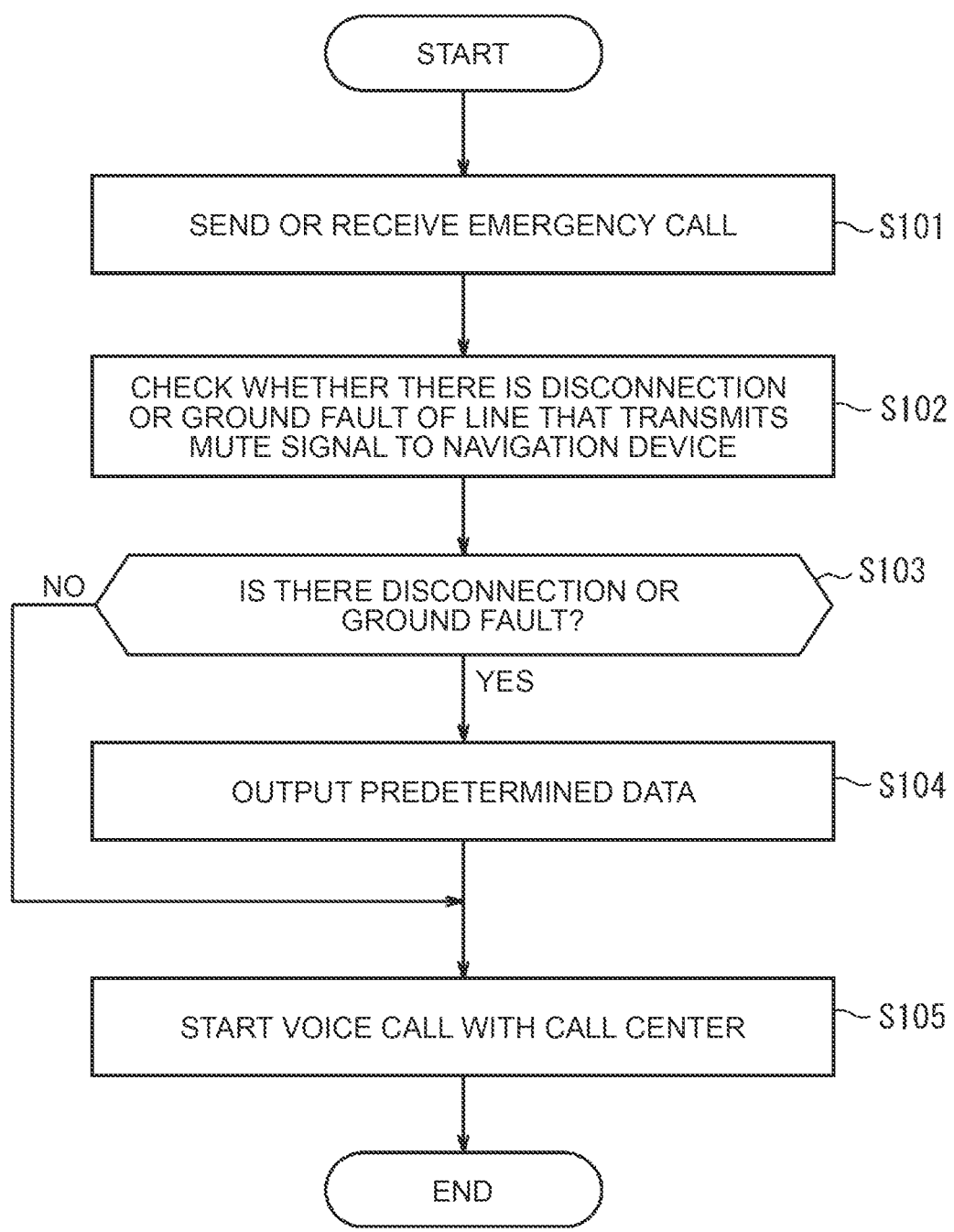

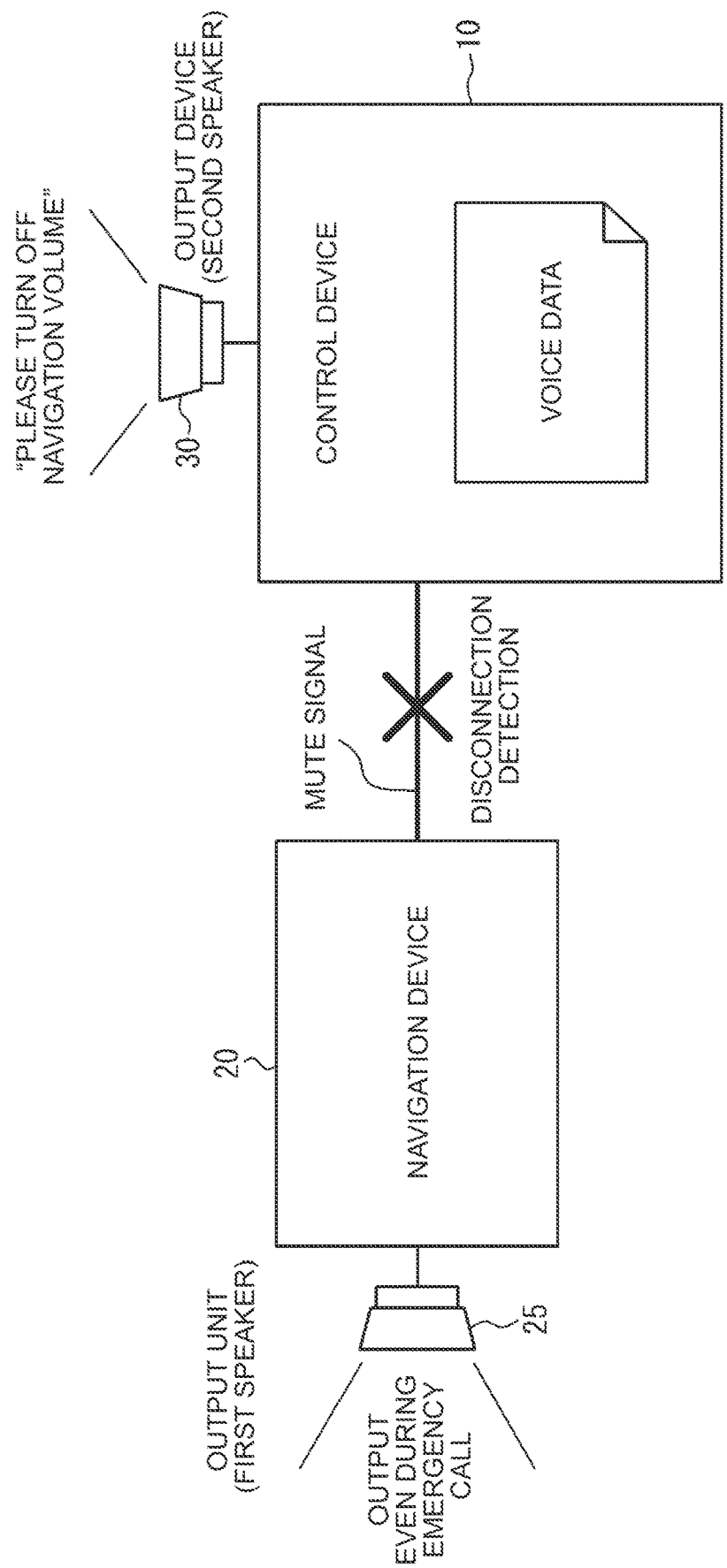

CONTROL DEVICE, CONTROL METHOD, AND STORAGE MEDIUM

CROSS-REFERENCE TO RELATED APPLICATION

This application claims priority to Japanese Patent Application No. 2023-004687 filed on Jan. 16, 2023, incorporated herein by reference in its entirety.

BACKGROUND

1. Technical Field

The present disclosure relates to control devices, control methods, and storage media.

2. Description of Related Art

A technique of turning off audio output of an in-vehicle speaker is known in the art. For example, Japanese Unexamined Patent Application Publication No. 2017-174120 (JP 2017-174120 A) discloses an emergency call system that turns off audio output of an in-vehicle speaker by transmitting a mute signal to a navigation device.

SUMMARY

In JP 2017-174120 A, when a user performs voice communication with an operator of a call center during an emergency call, the navigation device automatically receives the mute signal from a control device. However, for example, when the user has replaced a genuine navigation device from the manufacturer of the vehicle with a navigation device manufactured by a different company, the audio output of the in-vehicle speaker can no longer be turned off because there is no transmission line of the mute signal from the control device to the navigation device manufactured by the different company. Even when the vehicle is equipped with the genuine navigation device, the audio output of the in-vehicle speaker can no longer be turned off if a line that transmits the mute signal is disconnected or grounded due to a failure of the vehicle etc.

JP 2017-174120 A describes cutting off power supply to the navigation device as a way to solve the above problem. In this case, however, the user cannot check the location of the vehicle on a display using the navigation function while performing voice communication with an operator of a call center during an emergency call.

Therefore, there is room for improvement in the technique of turning off audio output of an in-vehicle speaker.

The present disclosure was made in view of such circumstances, and it is an object of the present disclosure to improve the technique of turning off audio output of an in-vehicle speaker.

A control device according to an embodiment of the present disclosure is a control device configured to transmit a mute signal to a navigation device including a speaker. The control device includes a control unit configured to, when an emergency call is sent or received, check whether there is a disconnection or ground fault of a line that transmits the mute signal to the navigation device, and when the disconnection or ground fault of the line is detected, cause an output device to output predetermined data.

A control method according to an embodiment of the present disclosure is a control method that is performed by a control device configured to transmit a mute signal to a navigation device including a speaker.

The control method includes: when an emergency call is sent or received, checking whether there is a disconnection or ground fault of a line that transmits the mute signal to the navigation device; and when the disconnection or ground fault of the line is detected, causing an output device to output predetermined data.

A storage medium according to an embodiment of the present disclosure stores a program that causes a control device configured to transmit a mute signal to a navigation device including a speaker to, when an emergency call is sent or received, check whether there is a disconnection or ground fault of a line that transmits the mute signal to the navigation device, and when the disconnection or ground fault of the line is detected, cause an output device to output predetermined data.

According to the embodiments of the present disclosure, the technique of turning off audio output of an in-vehicle speaker is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram illustrating a schematic configuration of a vehicle according to an embodiment of the present disclosure;

FIG. 2 is a flow chart showing the operation of the control device; and

FIG. 3 is a schematic diagram illustrating an example of the operation of the vehicle during an emergency call.

DETAILED DESCRIPTION OF EMBODIMENTS

Hereinafter, an embodiment of the present disclosure will be described.

Outline of Embodiment

With reference to FIG. 1, an outline of a vehicle 1 according to an embodiment of the present disclosure will be described. The vehicle 1 is, for example, an automobile. However, the vehicle 1 is not limited to an automobile and the vehicle 1 may be any vehicle. Vehicles include, but are not limited to, gasoline-powered vehicles, Battery Electric Vehicle (BEV), Hybrid Electric Vehicle (HEV), Plug-in Hybrid Electric Vehicle (PHEV), or Fuel Cell Electric Vehicle (FCEV).

The vehicle 1 includes a control device 10, a navigation device 20, and an output device 30. The control device 10, the navigation device 20, and the output device 30 are communicably connected by an in-vehicle network (for example, a Controller Area Network (CAN)).

The control device 10 is communicably connected to the call center 2 via a network 3 including the Internet, a mobile communication network, and the like. The control device 10 is configured to perform voice communication or data communication with the call center 2 via the network 3. In an emergency, the control device 10 sends an emergency call to the call center 2. In addition, the control device 10 receives an emergency call from an external server in case of an emergency. Further, when the control device 10 sends or receives an emergency call, it transmits a mute signal to the navigation device 20 to turn off the audio output of the navigation device 20.

The navigation device 20 tracks the location of the vehicle 1 on a map displayed on a display by any satellite-based positioning system (e.g., a Global Positioning System (GPS)). In addition, the navigation device 20 outputs music, audio guidance of navigation, and the like from a speaker, and displays text or video on a display. Further, upon receiving the mute signal from the control device 10, the navigation device 20 turns off the audio output of the speaker.

The output device 30 is a speaker installed at an arbitrary position in a vehicle cabin of the vehicle 1 for outputting sound, or a display for displaying text or video. During an emergency call, the output device 30 receives audio, text, or video stored in advance in the storage area of the control device 10 and outputs the audio, text, or video from a speaker or a display.

First, the outline of the present embodiment will be described, and the details will be described later. When an emergency call is sent or received, the control device 10 checks whether there is a disconnection or ground fault of a line that transmits a mute signal to the navigation device 20. When a disconnection or ground fault of the line is detected, the control device 10 causes the output device 30 to output predetermined data.

As described above, according to the present embodiment, the user can manually turn off the audio output of the navigation device 20 as prompted by the predetermined data output from the output device 30. As a result, the technique of turning off the audio output of the in-vehicle speaker is improved in that the probability that the user can perform the voice communication while checking the location of the vehicle on the display without cutting off the power supply to the navigation device 20 is improved.

Next, each configuration of the vehicle 1 will be described in detail.

Configuration of the Control Device

As illustrated in FIG. 1, the control device 10 includes a communication unit 11, a storage unit 12, a control unit 13, and an output unit 14.

The communication unit 11 includes one or more communication interfaces connected to the network 3. The communication interfaces correspond to mobile communication standards such as 4th Generation (4G) or 5th Generation (5G), for example, but are not limited thereto. In the present embodiment, the control device 10 communicates with the call center 2 via the communication unit 11 and the network 3.

The storage unit 12 includes one or more memories. The memories are, for example, a semiconductor memory, a magnetic memory, or an optical memory, but are not limited to these memories. Each memory included in the storage unit 12 may function as, for example, a main storage device, an auxiliary storage device, or a cache memory. The storage unit 12 stores arbitrary information used for the operation of the control device 10. For example, the storage unit 12 may store a system program, an application program, embedded software, and audio, text, video, etc. to be output by the output device 30 in case of an emergency call. The information stored in the storage unit 12 may be updatable by, for example, information acquired from the network 3 via the communication unit 11.

The control unit 13 may include one or more processors, one or more programmable circuits, one or more dedicated circuits, or a combination thereof. The processor may be, but is not limited to, a general-purpose processor such as, for example, Central Processing Unit (CPU) or Graphics Processing Unit (GPU), or a special-purpose processor specialized for a particular process. The programmable circuitry is, for example, but not limited to, Field-Programmable Gate Array (FPGA). The dedicated circuitry is, for example, but not limited to, Application Specific Integrated Circuit (ASIC). The control unit 13 controls the overall operation of the control device 10.

The output unit 14 includes at least one audio output interface capable of outputting audio, or at least one display interface capable of displaying text or video. The audio output interface is, for example, a speaker. The display interfaces are, for example, displays such as LCD or organic EL displays. However, the audio output interface and the display interface are not limited thereto.

Configuration of Navigation Device

As illustrated in FIG. 1, the navigation device 20 includes a communication unit 21, a positioning unit 22, a storage unit 23, a control unit 24, and an output unit 25.

The communication unit 21 includes one or more communication interfaces connected to the network 3. The communication interface corresponds to, for example, an in-vehicle network (e.g., CAN), a mobile communication standard, a wired Local Area Network (LAN) standard, or a wireless LAN standard, but is not limited thereto, and may correspond to any communication standard.

The positioning unit 22 includes one or more receivers that acquire location information of the vehicle 1. Specifically, the positioning unit 22 includes, for example, a receiver corresponding to GPS, but is not limited thereto, and may include a receiver corresponding to any satellite-based positioning system.

The storage unit 23 includes one or more memories. The memories included in the storage unit 23 may function as, for example, a main storage, an auxiliary storage, or a cache memory. The storage unit 23 stores arbitrary information used for the operation of the navigation device 20. For example, the storage unit 23 may store a system program, an application program, a database, map information, and the like. The information stored in the storage unit 23 may be updatable by, for example, information acquired from the network 3 via the communication unit 21.

The control unit 24 includes one or more processors, one or more programmable circuits, one or more dedicated circuits, or a combination thereof. The control unit 24 controls the overall operation of the navigation device 20.

The output unit 25 is configured to include at least one audio output interface capable of outputting audio and at least one display interface capable of displaying text or video. The audio output interface is, for example, a speaker. The display interfaces are, for example, a LCD or an organic EL display. However, the audio output interface and the display interface are not limited thereto.

Configuration of Output Device

The output device 30 shown in FIG. 1 is configured to include at least one audio output interface capable of outputting audio, or at least one display interface capable of displaying text or video. The audio output interface is, for example, a speaker. The display interfaces are, for example, displays such as LCD or organic EL displays. However, the audio output interface or the display interface is not limited thereto. The speaker or the display may be installed at any place in the vehicle cabin of the vehicle 1, and may be used as the output device 30.

Operation Flow of Control Device

The operation of the control device 10 according to the present embodiment will be described with reference to FIG. 2.

S101: The communication unit 11 sends or receives an emergency call.

In the present embodiment, when the vehicle 1 encounters road closure, a traffic congestion, a natural disaster such as a landslide, or an emergency situation such as a traffic accident, the communication unit 11 sends an emergency call to the call center 2. In addition, the communication unit 11 may receive an emergency call via the network 3 from an external server used by a road administrator such as a road traffic information center.

S102: The control unit 13 checks whether there is a disconnection or ground fault of a line that transmits a mute signal to the navigation device 20.

When the user driving the vehicle 1 performs voice communication with the operator of the call center 2, the voice output from the navigation device 20 hinders the voice communication. Therefore, the control unit 13 transmits the mute signal to the navigation device 20 including the speaker. When the communication unit 21 receives the mute signal, the control unit 24 of the navigation device 20 causes the output unit 25 to turn off audio output.

FIG. 3 is a schematic diagram illustrating an example of the operation of the vehicle 1 in case of an emergency call. As illustrated in FIG. 3, the navigation device 20 includes an output unit 25. The output unit 25 includes a speaker for outputting audio (first speaker in FIG. 3) and a display for displaying text or video. In response to the mute signal, the control unit 24 turns off the audio output from the output unit 25.

S103-S104: When a disconnection or ground fault of the line is detected, the control unit 13 causes the output device 30 to output predetermined data.

When a disconnection or ground fault is not detected in a line for transmitting a mute signal from the control device 10 to the navigation device 20, the control unit 24 turns off the audio output from the output unit 25 when the communication unit 21 of the navigation device 20 receives the mute signal. However, for example, when a genuine navigation device capable of connecting a line for transmitting a mute signal is replaced with a navigation device manufactured by another company, a line for transmitting a mute signal from the control device 10 may not be connected to the navigation device 20 manufactured by another company. Furthermore, even when the vehicle is equipped with the genuine navigation device 20, the control device 10 cannot transmit the mute signal to the navigation device 20 if the line that transmits the mute signal is disconnected or grounded due to a failure of the vehicle etc. As a result, as shown in FIG. 3, the audio output from the output unit 25 is continued even during an emergency call. Such voice output may interfere with voice communication between the user and the operator of the call center 2.

The predetermined data is audio, text, or video including a message prompting the user to mute the navigation device 20. The output device 30 is a speaker for outputting audio or a display for displaying text or video. As shown in FIG. 3, the predetermined message includes, for example, a message such as "Please turn OFF navigation volume" or "A conversation with the operator will start. Please turn OFF navigation volume," but the content of the message is not limited to these. The output device 30 may output the message from a speaker (second speaker in FIG. 3) by audio, or may display the message by text or video on a display. Note that the output device 30 may include both a speaker and a display, and may output predetermined data by audio and display the data by text or video at the same time. With this configuration, the message can be more reliably transmitted to the user.

In the present embodiment, the control device 10 (the control unit 13) is configured to cause the output device 30 to output predetermined data, but may cause the output unit 14 included in the control device 10 to output predetermined data. In such a case, the output unit 14 is a speaker for outputting audio, or has a display for displaying text or video.

The user who has confirmed the contents of the predetermined data output by the output device 30 manually turns off the audio output of the navigation device 20.

S105: The communication unit 11 starts voice communication with the call center 2.

The user who has confirmed that the voice output of the navigation device 20 is turned off starts voice communication with the operator of the call center 2. The user and the operator are not limited to voice communication, and may perform data communication such as chat.

As described above, when an emergency call is sent or received, the control device 10 according to the present embodiment checks whether there is a disconnection or ground fault of a line that transmits a mute signal to the navigation device 20, and when the disconnection or ground fault of the line is detected, causes the output device 30 to output predetermined data.

According to this configuration, the user can manually turn off the audio output of the navigation device 20 as prompted by the predetermined data output from the output device 30. As a result, the technique of turning off the audio output of the in-vehicle speaker is improved in that the probability that the user can perform the voice communication while checking the location of the vehicle on the display without cutting off the power supply to the navigation device 20 is improved.

Although the present disclosure has been described above based on the drawings and the embodiments, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or can be divided.

For example, in the above-described embodiment, the configuration and operation of the control device 10 may be distributed among a plurality of computers capable of communicating with each other. Further, for example, an embodiment in which some or all of the components of the control device 10 are provided in the navigation device 20 is also possible. For example, the navigation device 20 may include some or all of the components of the control device 10.

In the above embodiment, when the vehicle 1 encounters road closure, a traffic congestion, a natural disaster such as a landslide, or an emergency situation such as a traffic accident, the communication unit 11 sends an emergency call to the call center 2. When the above emergency situation occurs or is expected to occur in a predetermined area, an external server used by a road administrator such as a road traffic information center simultaneously sends an emergency call to users driving a plurality of vehicles 1 using a Push technique. In such a case as well, turning off the audio output of the speaker of the navigation device 20 that hinders listening to the emergency call improves the probability that the user can reliably listen to the contents of the emergency call while checking the location of the vehicle on the display without cutting off power supply to the navigation device 20. In this regard, the technique of turning off the audio output of the in-vehicle speaker is improved.

Further, for example, an embodiment in which a general-purpose computer functions as the control device 10 according to the above-described embodiment is also possible. Specifically, a program describing processing contents for realizing each function of the control device 10 according to the above-described embodiment is stored in a memory of a general-purpose computer, and the program is read and executed by a processor. Therefore, the present disclosure can also be realized as a program that can be executed by the processor or a non-transitory computer-readable medium that stores the program. The non-transitory computer-readable medium is an example of a storage medium.

What is claimed is:

1. A control device mounted on a vehicle including a navigation device including a first speaker, a second speaker which is not included in the navigation device, and a display, the control device comprising;
   a memory configured to store predetermined data including audio, text, and video to be output by the second speaker and the display, and
   a processor configured to:
      communicatively connect to a server via a network;
      in a case where the vehicle encounters at least one of: a road closure, traffic congestion, a natural disaster, or a traffic accident,
         send an emergency call to the server or receive the emergency call from the server via the network, and
         transmit a mute signal to the navigation device to mute the first speaker via the network or a physical line;
      in a case where the emergency call is sent or received, detect whether there is a disconnection in the network or a ground fault of the physical line; and
      in a case where the disconnection in the network or the ground fault of the physical line is detected, cause the second speaker and the display to output the predetermined data, the predetermined data being a message indicating the emergency call is sent or received and prompting a user to mute the first speaker.

2. A control method that is performed by a control device mounted on a vehicle including a navigation device including a first speaker, a second speaker which is not included in the navigation device, and a display, the control method comprising:
   acquiring, from a memory, predetermined data including audio, text, and video to be output by the second speaker and the display;
   communicatively connecting to a server via a network;
   in a case where the vehicle encounters at least one of: a road closure, traffic congestion, a natural disaster, or a traffic accident,
      sending an emergency call to the server or receive the emergency call from the server, and
      transmitting a mute signal to the navigation device to mute the first speaker via the network or a physical line;
   in a case where the emergency call is sent or received, detecting whether there is a disconnection in the network or a ground fault of the physical line; and
   in a case where the disconnection in the network or the ground fault of the physical line is detected, causing the second speaker and the display to output predetermined data, the predetermined data being a message indicating the emergency call is sent or received and prompting a user to mute the first speaker.

3. A non-transitory storage medium storing instructions performed by a control device mounted on a vehicle including a navigation device including a first speaker, a second speaker which is not included in the navigation device, and a display, the instructions cause the control device to,
   acquire, from a memory, predetermined data including audio, text, and video to be output by the second speaker and the display;
   communicatively connect to a server via a network;
   in a case where the vehicle encounters at least one of: a road closure, traffic congestion, a natural disaster, or a traffic accident,
      send an emergency call to the server or receive the emergency call from the server, and
      transmit a mute signal to the navigation device to mute the first speaker via the network or a physical line;
   in a case where the emergency call is sent or received, detect whether there is a disconnection in the network or a ground fault of the physical line, and
   in a case where the disconnection in the network or the ground fault of the physical line is detected, cause the second speaker and the display to output the predetermined data, the predetermined data being a message indicating the emergency call is sent or received and prompting a user to mute the first speaker.

* * * * *